US012705601B2

(12) United States Patent
Modi et al.

(10) Patent No.: US 12,705,601 B2
(45) Date of Patent: Aug. 11, 2026

(54) BLOCKCHAIN-BASED SYSTEMS AND METHODS FOR IMPLEMENTING INFLOW/OUTFLOW OF DIGITAL ASSETS AND NON-DIGITAL ASSETS

(71) Applicant: CBOE EXCHANGE, INC., Chicago, IL (US)

(72) Inventors: Nishank Modi, Chicago, IL (US); Michael Izhaky, Chicago, IL (US); Florian Huchede, Chicago, IL (US); Daniel Zubarchuk, Chicago, IL (US); Alok Khuntia, Chicago, IL (US)

(73) Assignee: CBOE EXCHANGE, INC., Chicago, IL (US)

( * ) Notice: Subject to any disclaimer, the term of this patent is extended or adjusted under 35 U.S.C. 154(b) by 211 days.

(21) Appl. No.: 18/456,408

(22) Filed: Aug. 25, 2023

(65) Prior Publication Data

US 2024/0070652 A1 Feb. 29, 2024

Related U.S. Application Data

(60) Provisional application No. 63/401,467, filed on Aug. 26, 2022.

(51) Int. Cl.

*G06Q 20/36* (2012.01)
*G06Q 20/38* (2012.01)
*G06Q 20/40* (2012.01)

(52) U.S. Cl.

CPC ..... *G06Q 20/3672* (2013.01); *G06Q 20/3825* (2013.01); *G06Q 20/389* (2013.01); *G06Q 20/4014* (2013.01); *G06Q 2220/00* (2013.01)

(58) Field of Classification Search

None
See application file for complete search history.

(56) References Cited

U.S. PATENT DOCUMENTS

| | | | | |
|---|---|---|---|---|
| 10,621,561 | B1 * | 4/2020 | Brock | G06Q 20/381 |
| 11,522,700 | B1 * | 12/2022 | Auerbach | G06Q 20/065 |
| 11,935,020 | B1 * | 3/2024 | Fakhraie | G06Q 20/3267 |
| 12,210,984 | B2 * | 1/2025 | Cella | G06Q 10/04 |
| 12,265,953 | B1 * | 4/2025 | Harrison | G06Q 20/36 |
| 2015/0220928 | A1 * | 8/2015 | Allen | G06Q 20/10 705/67 |

(Continued)

OTHER PUBLICATIONS

M. de Vos, C. U. Ileri, and J. Pouwelse, "XChange: A Blockchain-based Mechanism for Generic Asset Trading in Resource-constrained Environments," arXiv [cs.DC]. 2020, retrieved from https://arxiv.org/abs/2004.05046 (Year: 2020).*

*Primary Examiner* — Eduardo Castilho
(74) *Attorney, Agent, or Firm* — MARSHALL, GERSTEIN & BORUN LLP

(57) ABSTRACT

Blockchain-based systems and methods for implementing inflow/outflow of digital assets and non-digital assets. The blockchain-based systems and methods may include: (1) generating a set of digital tokens distributable on a distributed computer network; (2) assigning a subset of digital tokens of the set of digital tokens to a digital wallet of a user; (3) determining whether an electronic funding wallet of the user is linked to the digital wallet; and/or (4) executing an inflow/outflow algorithm by one or more processors of an electronic platform communicatively coupled to the distributed computer network.

20 Claims, 2 Drawing Sheets

(56) References Cited

U.S. PATENT DOCUMENTS

| | | | | |
|---|---|---|---|---|
| 2015/0348017 | A1* | 12/2015 | Allmen | G06Q 20/367<br>705/76 |
| 2015/0363770 | A1* | 12/2015 | Ronca | G06Q 20/382<br>705/64 |
| 2016/0162882 | A1* | 6/2016 | McClung, III | G06Q 20/352<br>705/41 |
| 2016/0342978 | A1* | 11/2016 | Davis | G06Q 20/0655 |
| 2017/0004481 | A1* | 1/2017 | Slusser | G06Q 20/12 |
| 2018/0308116 | A1* | 10/2018 | Maggio | G06Q 20/3672 |
| 2018/0315027 | A1* | 11/2018 | Kumar | G06Q 20/3278 |
| 2019/0311353 | A1* | 10/2019 | Solis | G06Q 20/381 |
| 2019/0340586 | A1* | 11/2019 | Sheng | G06Q 20/367 |
| 2020/0005271 | A1* | 1/2020 | Baar | G06Q 20/12 |
| 2022/0020016 | A1* | 1/2022 | Scott | G06Q 20/40 |
| 2022/0358490 | A1* | 11/2022 | Seol | G06Q 20/0655 |
| 2024/0296497 | A1* | 9/2024 | Abraham | G06Q 20/10 |

* cited by examiner

BLOCKCHAIN-BASED SYSTEMS AND METHODS FOR IMPLEMENTING INFLOW/OUTFLOW OF DIGITAL ASSETS AND NON-DIGITAL ASSETS

CROSS REFERENCE TO RELATED APPLICATIONS

The present application claims the benefit of U.S. Provisional Patent Application No. 63/401,467, entitled "Systems and Methods for Administration of Fees and Benefits (Inflows and Outflows) on Digital Asset Holdings," filed on Aug. 26, 2022, which is hereby expressly incorporated by reference herein in its entirety.

FIELD

The present disclosure generally relates to blockchain-based systems and methods, and more particularly to blockchain-based systems and methods for implementing inflow/outflow of digital assets and non-digital assets.

BACKGROUND

Digital assets may have a variety of inflows and outflows in the form of other assets or currencies, such as fiat currencies (or "real-world currencies"), stable-coins, and/or the like. Examples of these inflows include management fees, transaction fees, physical storage costs, and administrative fees, and examples of these outflows include positive distributions and accrued interest appraisals.

However, these other assets or currencies often cannot be easily converted into digital assets or vice versa, especially without creating network-centric or otherwise online security risks arising from the underlying technology upon which the systems are based. For example, if a user is subject to an inflow (such as a management fee) in USD relating to their digital assets, they will either need to (A) sell a portion of their digital asset subject or (B) transmit off-chain asset credentials (such as debit or credit card information) to cover the inflow. Option (A) is undesirable because digital assets are often subject to volatile market forces and option (B) is undesirable because such transition of off-chain asset credentials are often susceptible to security concerns.

For the foregoing reasons, there is a need for blockchain-based systems and methods for implementing inflow/outflow of digital assets and non-digital assets, as further described herein.

SUMMARY

The blockchain-based systems and methods implement inflow/outflow of digital assets and non-digital assets. Digital assets comprise digital tokens, such as tokens (e.g., ETHEREUM tokens, BITCOIN tokens, or the like) on a blockchain based computer network. The blockchain-based systems and methods described herein provide for address the issues that arise when inflows and/or outflows occur to digital assets. Such issues include multiple security and authentication issues that arise in conventional computing systems. For example, such systems do implement linkage or a secure channel between electronic accounts (e.g., electronic wallets) of underlying computing systems to protect conversion of digital tokens to non-digital assets and the like. Typically, conventional computing systems are separate systems, where transmission of electronic requests from conversion to non-digital assets to digital tokens that are susceptible to interception by third parties (e.g., hackers) that can exploit a disjoint set of electronic online wallets.

The blockchain-based systems and methods described herein improve the security by implementing inflow/outflow algorithm on a digital platform. For example, to facilitate outflows of alternate assets (e.g., real-world currency such as USD), digital assets (e.g., digital tokens) may be converted to the alternate assets via a fixed conversion rate (e.g., 10.00 USD per 1 digital token). Alternatively, to avoid converting digital assets into alternate assets, users may link alternate outflow sources (e.g., electronic funding wallets) to their digital asset holdings (e.g., digital wallets) and designate those alternate outflow sources as the default outflow source.

As another example to facilitate inflows of alternate assets (e.g., real-world currency such as USD), the alternate assets may be converted into digital assets (e.g., digital tokens) via a fixed conversion rate (e.g., 0.1 digital tokens per 1.00 USD). Alternatively, to avoid converting alternate assets into digital assets, users may link alternate inflow sources (e.g., electronic funding wallets) to their digital asset holdings (e.g., digital wallets) and designate those alternate inflow sources as the default inflow source.

More specifically, as described herein a blockchain-based method is disclosed for implementing inflow/outflow of digital assets and non-digital assets. In various aspects, the blockchain-based method may include (1) generating, by one or more processors, a set of digital tokens distributable on a distributed computer network; (2) assigning, by one or more processors, a subset of digital tokens of the set of digital tokens to a digital wallet of a user; (3) determining, by one or more processors, whether an electronic funding wallet of the user is linked to the digital wallet; and/or (4) executing an inflow/outflow algorithm by one or more processors of an electronic platform communicatively coupled to the distributed computer network, the inflow/outflow algorithm causing the one or more processors of the electronic platform to implement: (i) detecting a request for an outflow of an alternate asset, and if the digital wallet is linked to the electronic funding wallet, distributing the alternate asset from the electronic funding wallet, (ii) detecting a request for an outflow of an alternate asset, and if the digital wallet is not linked to the electronic funding wallet, converting at least a portion of the one or more of the subset of digital tokens into the alternate asset, and distributing the alternate asset as converted, (iii) detecting a transmission of an inflow of an alternate asset, and if the digital wallet is linked to the electronic funding wallet, receiving the alternate asset at the electronic funding wallet, and/or (iv) detecting a transmission of an inflow of an alternate asset, and if the digital wallet is not linked to the electronic funding wallet, converting the alternate asset into additional digital tokens and adding the additional digital tokens to the one or more of the subset of digital tokens.

In addition, as described herein, a blockchain-based system is disclosed. The blockchain-based system is configured to implement inflow/outflow of digital assets and non-digital assets. In various aspects, the blockchain-based system may comprise one or more servers comprising one or more processors and one or more memories. The blockchain-based system may further comprise computing instructions stored in the one or more memories and configured to be executed on the one or more processors. The computing instructions, when executed by one or more processors, may cause the one or more processors to (1) generate a set of digital tokens distributable on a distributed computer network; (2) assign a subset of digital tokens of the set of digital tokens to a digital wallet of a user; (3) determine whether an electronic funding wallet of the user is linked to the digital wallet; and/or (4) execute an inflow/outflow algorithm by one or more processors of an electronic platform communicatively coupled to the distributed computer network, the inflow/outflow algorithm causing the one or more processors of the electronic platform to implement: (i) detecting a request for an outflow of an alternate asset, and if the digital wallet is linked to the electronic funding wallet, distributing the alternate asset from the electronic funding wallet, (ii) detecting a request for an outflow of an alternate asset, and if the digital wallet is not linked to the electronic funding wallet, converting at least a portion of the one or more of the subset of digital tokens into the alternate asset, and distributing the alternate asset as converted, (iii) detecting a transmission of an inflow of an alternate asset, and if the digital wallet is linked to the electronic funding wallet, receiving the alternate asset at the electronic funding wallet, and/or (iv) detecting a transmission of an inflow of an alternate asset, and if the digital wallet is not linked to the electronic funding wallet, converting the alternate asset into additional digital tokens and adding the additional digital tokens to the one or more of the subset of digital tokens.

Further, as described herein, a tangible, non-transitory computer-readable medium storing instructions for implementing inflow/outflow of digital assets and non-digital assets is disclosed. The instructions, when executed by one or more processors, may cause the one or more processors to (1) generate a set of digital tokens distributable on a distributed computer network; (2) assign a subset of digital tokens of the set of digital tokens to a digital wallet of a user; (3) determine whether an electronic funding wallet of the user is linked to the digital wallet; and/or (4) execute an inflow/outflow algorithm by one or more processors of an electronic platform communicatively coupled to the distributed computer network, the inflow/outflow algorithm causing the one or more processors of the electronic platform to implement: (i) detecting a request for an outflow of an alternate asset, and if the digital wallet is linked to the electronic funding wallet, distributing the alternate asset from the electronic funding wallet, (ii) detecting a request for an outflow of an alternate asset, and if the digital wallet is not linked to the electronic funding wallet, converting at least a portion of the one or more of the subset of digital tokens into the alternate asset, and distributing the alternate asset as converted, (iii) detecting a transmission of an inflow of an alternate asset, and if the digital wallet is linked to the electronic funding wallet, receiving the alternate asset at the electronic funding wallet, and/or (iv) detecting a transmission of an inflow of an alternate asset, and if the digital wallet is not linked to the electronic funding wallet, converting the alternate asset into additional digital tokens and adding the additional digital tokens to the one or more of the subset of digital tokens.

In accordance with the above, and with the disclosure herein, the present disclosure includes improvements in computer functionality or improvements to other technologies (e.g., distributed computer networks). These improvements are due, at least in part, to computing devices that reduce storage of user information by use of digital tokens as a single, or limited, storage source of digital assets, digital assets, and/or inflow/outflow algorithms on a blockchain-based computer network.

For example, digital tokens may be used in place of redundant storage of digital assets, digital assets, and/or inflow/outflow algorithms as would otherwise be stored by redundant and different centralized systems. That is, by linking digital assets and non-digital assets on a single underlying computing system, the blockchain-based systems and methods herein reduce storage of redundant user information across digital networks and platforms. This also results in less compute power and memory use by nodes of the system by not having to process and/or store redundant information. Therefore, computing resources are improved by reducing off-chain data storage and memory usage regarding user information.

In addition, the blockchain-based systems and methods include improvements in computer functionality or improvements to other technologies at least because the disclosed blockchain-based systems and methods improve security by removing the need for users to transmit off-chain asset credentials for inflows or outflows. That is, security may be improved by linking on-chain alternate asset holdings (e.g. electronic funding wallets) that contain alternate assets (e.g., real-world currency). That is, these on-chain alternate asset holdings may be linked to on-chain digital asset holdings (e.g., digital wallet) to facilitate the inflow/outflow algorithm described herein and are themselves are protected by the blockchain-based platform. The immutability of ownership of digital tokens and alternate assets on-chain, as recorded in the blockchain, prevents tampering of the user's identity and assets. Moreover, on-chain alternate asset holdings and on-chain digital asset holdings, as affiliated with a user, can serve as an indication of the user's authentication and/or authorization when accessing resources on a computer network, third party platform, or otherwise online, or via a display screen, thereby providing a unique and secure digital security mechanism on a user-to-token basis.

In addition, the present disclosure includes specific features other than what is well-understood, routine, conventional activity in the field, or adding unconventional steps that confine the claim to a particular useful application, e.g., blockchain-based systems and methods for implementing inflow/outflow of digital assets and non-digital assets, as further described herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
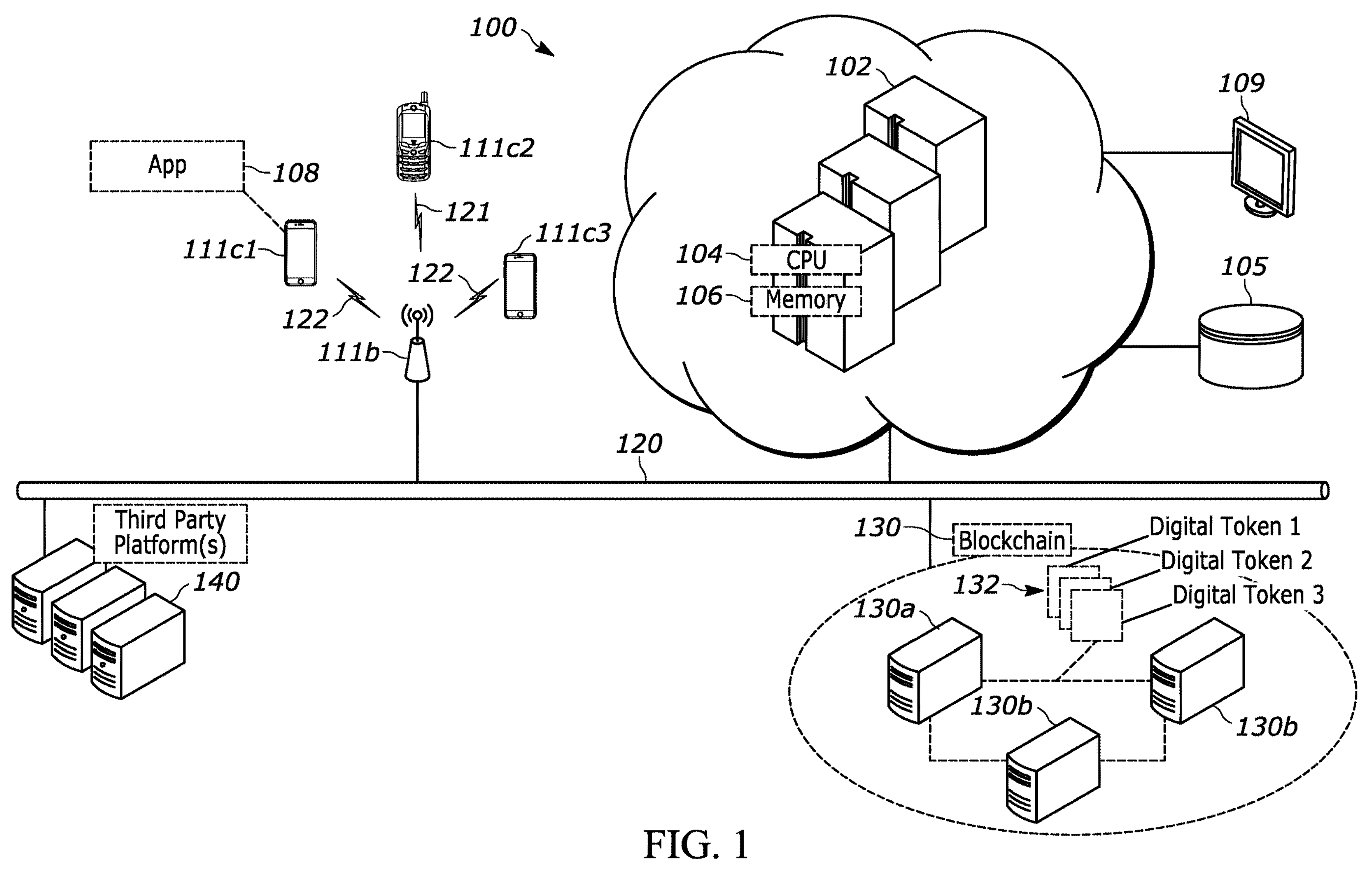
FIG. 1 illustrates an example blockchain-based system configured to implement inflow/outflow of digital assets and non-digital assets, in accordance with various aspects disclosed herein.

FIG. 1 illustrates an example blockchain-based system 100 configured to implement inflow/outflow of digital assets and non-digital assets, in accordance with various aspects disclosed herein.

In the example aspect of FIG. 1, blockchain-based system 100 includes server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, server(s) 102 may be any one or more cloud-based platform(s) such as MICROSOFT AZURE, GOOGLE CLOUD, AMAZON AWS, or the like. Server(s) 102 may include one or more processor(s) 104 as well as one or more computer memories 106.

Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory 106 may store an operating system (OS) (e.g., Microsoft Windows, Linux, UNIX, etc.) capable of facilitating the functionalities, apps, methods, or other software as discussed herein. Memory 106 may also store computing instructions for implementing any one or more of the blockchain-based method(s) as described herein, including as described herein with respect to FIG. 2. Additionally, or alternatively, off-chain user data (e.g., such as user profile information) or on-chain data or related data (e.g., user digital wallet information such as user public/private keys), digital token(s), and/or related information, or any other data or information, as described herein, may also be stored in memory 106 and/or database 105. Database 105 is accessible or otherwise communicatively coupled to server(s) 102. In addition, memories 106 may also store machine readable instructions, including any of one or more application(s) (e.g., an application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. The computing instructions or applications as described herein may be executed by the processor(s) 104.

The processor(s) 104 may be connected to the memory 106 via a computer bus responsible for transmitting electronic data, data packets, or otherwise electronic signals to and from the processor(s) 104 and memories 106 in order to implement or perform the algorithm, machine readable computing instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 105 (e.g., a relational database, such as Oracle, DB2, MySQL, or a NoSQL based database, such as MongoDB). The data stored in memories 106 and/or database 105 may include all or part of any of the data or information described herein.

Server(s) 102 may further include a communication component configured to communicate (e.g., send and receive) data via one or more external/network port(s) to one or more networks or local terminals, such as computer network 120 and/or terminal 109 (for rendering or visualizing) described herein. For example, in some aspects, server(s) 102 may include a client-server platform technology such as ASP.NET, Java J2EE, Ruby on Rails, Node.js, a web service or online API, responsive for receiving and responding to electronic requests. The server(s) 102 may implement the client-server platform technology that may interact, via the computer bus, with the memory 106 (including the application(s), component(s), API(s), data, etc. stored therein) and/or database 105 to implement or perform the algorithm, machine readable instructions, methods, processes, elements or limitations, as illustrated, depicted, or described for the various flowcharts, illustrations, diagrams, figures, and/or other disclosure herein.

In various aspects, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Server(s) 102 may further include or implement an operator interface configured to present information to an administrator or operator and/or receive inputs from the administrator or operator. As shown in FIG. 1, an operator interface may provide a display screen (e.g., via terminal 109). Server(s) 102 may also provide I/O components (e.g., ports, capacitive or resistive touch sensitive input panels, keys, buttons, lights, LEDs), which may be directly accessible via, or attached to, server(s) 102, or may be indirectly accessible via or attached to terminal 109. According to some aspects, an administrator or operator may access the server 102 via terminal 109 to review information, make changes, establish or configure digital tokens, and/or perform other functions as described herein.

As described herein, in some aspects, server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the e.g., code to allow users to interact with their digital wallets or otherwise with a blockchain) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

As shown in FIG. 1, server(s) 102 are communicatively connected, via computer network 120 to the one or more user computing devices 111*c*1-111*c*3 via base station 111*b*. In some aspects, base station 111*b* may comprise one or more cellular base stations, such as cell towers, communicating to the one or more user computing devices 111*c*1-111*c*3 via wireless communications 121 based on any one or more of various mobile phone standards, including NMT, GSM, CDMA, UMMTS, LTE, 5G, or the like. Additionally, or alternatively, base station 111*b* may comprise routers, wireless switches, or other such wireless connection points communicating to the one or more user computing devices 111*c*1-111*c*3 via wireless communications 122 based on any one or more of various wireless standards, including by non-limiting example, IEEE 802.11a/b/c/g (WIFI), the BLUETOOTH standard, or the like.

Any of the one or more user computing devices 111*c*1-111*c*3 may comprise mobile devices and/or client devices for accessing and/or communicating with server(s) 102. Such mobile devices may comprise one or more mobile processor(s) and/or an imaging device for capturing images. In various aspects, user computing devices 111*c*1-111*c*3 may comprise a mobile phone (e.g., a cellular phone), a tablet device, a personal data assistance (PDA), or the like, including, by non-limiting example, an APPLE iPhone or iPad device or an ANDROID based mobile phone or tablet. In various aspects, the one or more user computing devices 111*c*1-111*c*3 may implement or execute an operating system (OS) or mobile platform such as APPLE iOS and/or ANDROID operation system. Any of the one or more user computing devices 111*c*1-111*c*3 may comprise one or more processors and/or one or more memories for storing, implementing, or executing computing instructions or code, e.g., a mobile application, as described in various aspects herein.

As shown in FIG. 1, application (app) 108 and/or an application as described herein, or at least portions thereof, may also be stored locally on a memory of a user computing device (e.g., user computing device 111*c*1). App 108 may be configured to collect and/or display information regarding user data (e.g., such as user profile information) or off-chain data, (e.g., user digital wallet information such as user public/private keys) or on-chain data (e.g., digital token(s)), and/or other data or information as described herein. App 108 may be configured to perform or execute other actions as described herein, such as communicate with or transmit information and/or data to and from server(s) 102. For example, app 108 may comprise a user's digital wallet used to communicate with blockchain 130, for example, to submit or review transactions related to digital tokens (e.g., digital tokens 1-3 as shown for FIG. 1) as stored on blockchain 130 and/or to send and/or receive indications of affiliation information, association information, and/or ownership information of digital tokens (e.g., digital token indications 1-3.

A user's digital wallet may comprise the user's cryptographic keys, such as the user's private key and public key. The public key may be viewed publicly by other users and may be used to identify the user on-chain (e.g., on blockchain 130) and off-chain (e.g., more generally on computer network 120, on server(s) 102, on third party platform(s) 140, and/or on app 108 via computing devices 111*c*1-111*c*3). In addition, the user's cryptographic keys each comprise a string of data that identifies the user and provides access to the user's digital wallet. The user's private key and public key provide the user with a secure digital identity on the blockchain 130 that may be used to authenticate the user via digital signatures and make transactions, such as trading digital tokens (e.g., any one or more of digital tokens 1-3) on the blockchain 130, or otherwise authenticating inflow/outflow or conversion of assets (e.g., digital to non-digital and vice-versa) that involve the blockchain 130.

User computing devices 111*c*1-111*c*3 may each comprise a wireless transceiver to receive and transmit wireless communications 121 and/or 122 to and from base station 111*b*.

Blockchain 130 comprises a blockchain-based software platform that allows generation, storage, recordation, transaction, and/or otherwise manipulation of digital assets, such as digital tokens. Blockchain 130 may implement one or more blockchain-based software algorithms, standards, or protocols which can comprise, for example the ETHEREUM standard (e.g., ERC-20). Blockchain 130 may comprise various computing nodes, such as computing nodes 130*a*, 130*b*, and 130*c*. Computing nodes 130*a*-130*c* comprise individual computers or computing platforms configured to validate or authorize blockchain transactions, in a series of blocks, stored on-chain, that is, on blockchain 130. Blockchain 130 may store, or otherwise record, transactions that reference a set of digital tokens, e.g., set of digital tokens 132 comprising at least digital token 1, digital token 2, and digital token 3 as illustrated for FIG. 1.

Each of digital token 1, digital token 2, and/or digital token 3 may comprise fungible tokens and/or non-fungible tokens. It is to be understood that while set of digital tokens 132 illustrate a set of three tokens, the set of digital tokens 132 may comprise millions of digital tokens as part of blockchain 130.

Third party platform(s) 140 may comprise server(s) or computing platforms associated with an entity or person. For example, in one example, third party platform(s) 140 may correspond to server(s) or a computing platform associated with an entity such as a sports team, a company, merchandiser, or other such entity. As another example, third party platform(s) 140 may correspond to server(s) or a computing platform associated with a person such as a musician, actor, star, influencer, or other such individual. Third party platform(s) 140 may comprise one or more processors, that receive requests and send information on computer network 120. In various aspects, the third party platform(s) 140 may make requests, receive requests, and/or provide responses regarding transactions with a user of a computing device (e.g., computing device 111*c*1) regarding digital assets (e.g., tokens) or non-digital assets as described herein.

Figure 2:
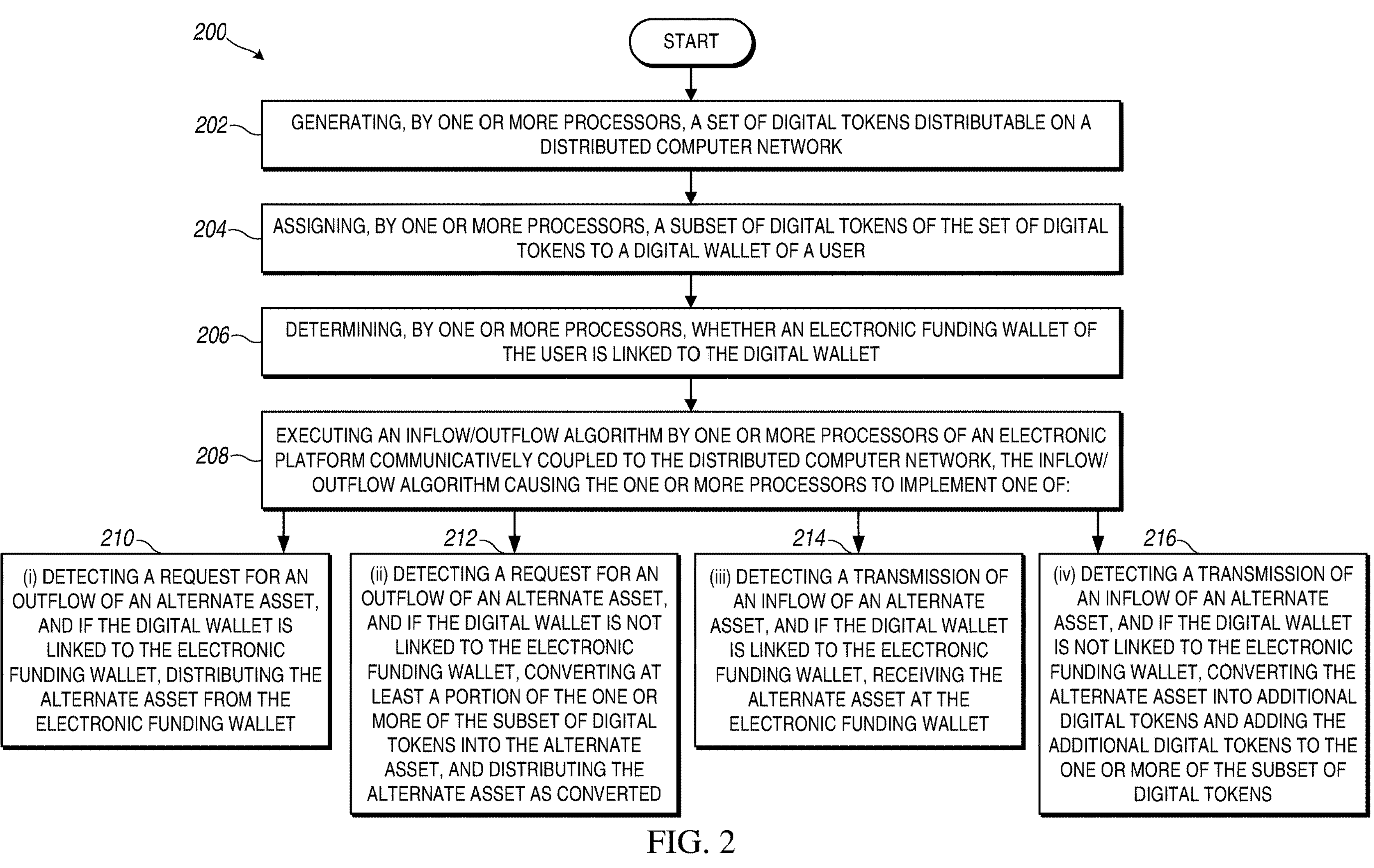
FIG. 2 illustrates an example blockchain-based method for implementing inflow/outflow of digital assets and non-digital assets, in accordance with various aspects disclosed herein.

FIG. 2 illustrates an example blockchain-based method 200 for implementing inflow/outflow of digital assets (e.g., any one or more of digital tokens 1-3 of set of digital tokens 132) and non-digital assets (e.g., real-world currency, real-world items and/or assets, etc.), in accordance with various aspects disclosed herein. At block 202, method 200 may include generating, by one or more processors, a set of digital tokens (e.g., set of digital tokens 132) distributable on a distributed computer network (e.g., blockchain 130). The one or more processors, as used to generate or otherwise establish the digital tokens, may comprise, by way of non-limiting example, one or more processors of an off-chain server (e.g., CPU 104 of server(s) 102), one or more processors of an on-chain network (e.g., processors of computing node(s) 130*a*-130*c*), and/or off-chain computers (e.g., server(s) 102) in conjunction with a distributed network computers (e.g., processors of computing node(s) 130*a*-130*c*). For example, the off-chain server (e.g., server (s) 102) may generate the set of tokens 132 by submitting a request to blockchain 130 to create or otherwise establish digital tokens 1-3. Digital tokens 1-3 may comprise fungible tokens or non-fungible tokens (NFTs). Digital tokens may be traded on blockchain 130 among users. In this way, digital tokens may increase and/or decrease in value.

In some aspects, blockchain 130 comprises an ETHEREUM-based platform or blockchain. In such aspects, digital tokens 1-3 of set of tokens 132 may comprise ERC-20 standard-based tokens. Such tokens may comprise smart contracts, which include executable computing code or instructions, or software that execute when predetermined conditions are met. For example, a smart contract, as part of a digital token, may be executed for facilitating transactions or other interactions between users of the digital tokens. For digital tokens based on the ERC-20 standard, rules are established regarding how tokens can be transferred, how transactions are approved, how users can access data about a token, and the total supply of tokens. For example, ERC-20 defines six different implementation coding functions for the benefit of other tokens within the Ethereum system. In terms of implementation coding for ERC-20 tokens, the six basic coding functions comprise: total supply, balance, allowance, approval, transfer, and transfer from. Such coding functions may be used to define the smart contract aspects of a given token (e.g., digital tokens 1-3).

In is to be understood, however, that an ETHEREUM-based platform is but one example of a distributed computer network, and that other blockchain-based networks or distributed systems, based on different standards, may be used in accordance with the disclosure herein.

At block 204, method 200 may include assigning, by one or more processors, a subset of digital tokens of the set of digital tokens (e.g., subset of digital tokens 132) to a digital wallet of a user. For example, the subset of digital tokens may be a number of digital tokens purchased from a user from a limited pool of digital tokens.

At block 206, method 200 may include determining, by one or more processors, whether an electronic funding wallet of the user is linked to the digital wallet. The user may link an electronic funding wallet to the digital wallet such that both are on the same secure platform. For example, the assets of the electronic funding wallet may be one or more stablecoins (e.g., digital assets that are backed by a real-world currency or commodity). As another example, the assets of the electronic funding wallet may be one or more indications of alternate assets (e.g., savings in an account) whose totals are verified by the blockchain. In addition, the "link" between the electronic funding wallet and the digital wallet may allow for the easy conversion between assets of the electronic funding wallet and digital assets of the digital wallet (e.g., via a fixed conversion rate) all while on the same secure platform. In some aspects, each of the electronic wallets (e.g., the digital wallet and the electronic funding wallet) are each stored on-chain (e.g., on blockchain 130). In the alternative, in other aspects, each of the electronic wallets (e.g., the digital wallet and the electronic funding wallet) are each stored off-chain (e.g., server(s) 102). Still further, in other alternative aspects, the electronic wallets (e.g., the digital wallet and the electronic funding wallet) stored on-chain (e.g., on blockchain 130) and off-chain (e.g., server(s) 102), but linked together on the same platform, or where the off-chain portion (e.g., server(s) 102) is securely and/or privately connected (e.g., via a virtual private network (VPN)) to the on-chain portion (e.g., on blockchain 130).

At block 208, method 200 may include executing an inflow/outflow algorithm (e.g., an inflow/outflow mechanism) by one or more processors of an electronic platform communicatively coupled to the distributed computer network. In various aspects, the algorithm may comprise machine readable computing instructions executable by the one or more processors of the electronic platform. As a demonstrative example of the inflow/outflow algorithm, a user may have an electronic funding wallet comprising 500.00 USD and a digital wallet comprising 50 digital tokens. Additionally, each of the digital tokens may have an initial value of 10.00 USD. The user may be subjected to a per period storage fee of 0.01 USD per digital token in the user's digital wallet (e.g., an outflow of 0.01 USD), and the user may have a per period distribution rate of 0.02 USD per digital token that in the user's digital wallet (e.g., an inflow of 0.02 USD). Further, the digital tokens may be subject to a conversion fee (e.g., "transactional friction") of 0.05 digital tokens when converted into USD.

At block 210, the inflow/outflow algorithm may cause the one or more processors of the electronic platform to implement detecting a request for an outflow of an alternate asset (e.g., real-world currency, real-world items, real-world assets, and/or some other non-digital asset), and if the digital wallet is linked to the electronic funding wallet, distributing the alternate asset from the electronic funding wallet. Referring back to the aforementioned demonstrative example, if the platform determines that the user's electronic funding wallet is linked to the user's digital wallet, the platform may deduct 0.50 USD from the user's electronic funding wallet (e.g., the product between 0.01 USD storage fee and the 50 digital tokens in the user's digital wallet). After the deduction, the user has a remainder of 499.95 USD in their electronic funding wallet and 50 digital tokens in their digital wallet.

Additionally or alternatively, at block 212, the inflow/outflow algorithm may cause the one or more processors of the electronic platform to implement detecting a request for an outflow of an alternate asset, and if the digital wallet is not linked to the electronic funding wallet, converting at least a portion of the one or more of the subset of digital tokens into the alternate asset, and distributing the alternate asset as converted. Referring back to the aforementioned demonstrative example, if the platform determines that the user's electronic funding wallet is not linked to the user's digital wallet, the platform may convert 0.055 digital tokens from the user's digital wallet (e.g., the sum of: (the previously calculated storage fee of 0.50 USD storage fee divided by the conversion rate of 10 USD per digital token) and the conversion fee of 0.05 digital tokens) into USD and then deduct that converted USD. After the deduction, the user has a remainder of 500.00 USD in their electronic funding wallet and 49.945 digital tokens in their digital wallet.

Additionally or alternatively, at block 214, the inflow/outflow algorithm may cause the one or more processors of the electronic platform to implement detecting a transmission of an inflow of an alternate asset, and if the digital wallet is linked to the electronic funding wallet, receiving the alternate asset at the electronic funding wallet. Referring back to the aforementioned demonstrative example, if the platform determines that the user's electronic funding wallet is linked to the user's digital wallet, the platform may add 1.00 USD to the user's electronic funding wallet (e.g., the product between 0.02 USD distribution rate and the 50 digital tokens in the user's digital wallet). After the addition, the user has a remainder of 501.00 USD in their electronic funding wallet and 50 digital tokens in their digital wallet.

Additionally or alternatively, at block 216, the inflow/outflow algorithm may cause the one or more processors of the electronic platform to implement detecting a transmission of an inflow of an alternate asset, and if the digital wallet is not linked to the electronic funding wallet, converting the alternate asset into additional digital tokens and adding the additional digital tokens to the one or more of the subset of digital tokens. Referring back to the aforementioned demonstrative example, if the platform determines that the user's electronic funding wallet is not linked to the user's digital wallet, the platform may add 0.095 digital tokens to the user's digital wallet (e.g., the sum of: (the previously calculated storage fee of 1.00 USD storage fee divided by the conversion rate of 10.00 USD per digital token) and the conversion fee of 0.05 digital tokens). After the addition, the user has a remainder of 500.00 USD in their electronic funding wallet and 50.095 digital tokens in their digital wallet.

In some embodiments, the inflow/outflow algorithm of method 200 may operate according to a default parameter. The default parameter may determine whether either the digital wallet or the non-digital wallet is a default source for any inflows and/or outflows. For example, if the electronic funding wallet is linked to the digital wallet, the platform may initially designate either the electronic funding wallet or the digital wallet as the default source for inflows/outflows. Alternatively or additionally, if the electronic funding wallet is linked to the digital wallet, the user may designate either the electronic funding wallet or the digital wallet as the default source for inflows/outflows. The default parameter may cause the inflow/outflow algorithm to avoid conversion in some aspects. For example, to avoid converting a digital asset into funding asset(s) (e.g., of the electronic funding wallet), the inflow/outflow algorithm, by reading the default parameter when set to digital asset preferred value, can be configured to link outflow sources to the digital wallet and establish digital assets sources as a default outflow source. As a further example, to avoid converting a funding inflow asset(s) (e.g., of the electronic funding wallet) to a digital asset, the inflow/outflow algorithm, by reading the default parameter when set to funding asset preferred value, can be configured to link inflow sources to the electronic funding wallet and establish funding asset sources as a default inflow source.

In additional embodiments, method 200 may further include receiving, by one or more processors from the user, cryptographic keys, wherein the cryptographic keys may include a public key and a private key pair. In these embodiments, the public key publicly may identify the user while securing (i) the electronic funding wallet, (ii) the digital wallet, and/or (iii) the distributed computer network, and the private key may grant the user access to (i) the electronic funding wallet, (ii) the digital wallet, and/or (iii) the distributed computer network upon validation of the cryptographic keys by one or more nodes on the distributed computer network. In some embodiments, public key may secure both the electronic funding wallet and the digital wallet if the electronic funding wallet on the electronic platform implementing the inflow/outflow algorithm. In addition, the public and/or private key may be used to authenticate the link between the digital wallet and the electronic funding wallet, where, for example, the conversion of assets from one wallet to the other is authenticated (or otherwise precluded) by a digital signature or otherwise confirmation as implemented by the public and/or private key.

In additional embodiments, the one or more digital tokens in the subset of digital tokens of method 200 may be configured to provide regulatory compliance through identification of the user. Additionally or alternatively, in some embodiments, each digital token in the subset of digital tokens can be exchanged for (i) real-world currency, (ii) real-world items, and/or (iii) virtual items. Additionally or alternatively, in some embodiments, each digital token in the subset of digital tokens may be configured for electronic trade for one or more other digital tokens as provided to other users. In these embodiments, a first value of each digital token in the subset of digital tokens may vary with respect to respective values of the one or more other digital tokens based upon one or more exchange rates.

More generally, by using app 108, as executing on a user computing device(s) 111*c*1-111*c*3, a user (e.g., the first user) may access, trade, sell, buy, or otherwise interact with digital tokens 1-3. For example, the first user may access app 108 that stores or has access to the user's digital wallet. The digital wallet may store or list the user's digital tokens, cryptographic keys (e.g., public and/or private keys), account information, or other information related to the user. The user's digital wallet may be stored locally (e.g., on user computing device 111*c*1) and/or remotely (e.g., stored in memory 106 of server(s) 102). The user may use a GUI rendered by app 108 to interact with his or her digital wallet, such as by performing actions as described herein, including, for example, actions such as using either the user's digital wallet and/or electronic funding wallet to send or receive assets, and having such assets converted, automatically, by the inflow/outflow algorithm as described herein. The one or more digital tokens may be configured to perform actions, such as execute code or computing instructions, e.g., as part of a smart contract, in order to grant access, authorize transactions, digitally sign, and/or perform other activities, including any as described herein.

In additional aspects, digital tokens from the digital wallet, or otherwise assets from the electronic funding wallet, may be exchanged with an entity (e.g., a third party of third party platform(s) 140) and/or other users. For example, in some aspects, digital tokens and/or alternate assets may be configured to be provided to the entity in exchange for a real-world item. In other aspects, dividends distributed (e.g., in the form of USD) from an asset (e.g., a stock) could be sent to the user's account (e.g., electronic funding wallet), but such that the dividend amount is converted by the inflow/output algorithm into digital tokens and then added to the digital wallet as linked to the electronic funding wallet as described herein. As a further example, the user's digital wallet may be subject to blockchain-based storage fees, which are typically charged in the form of token values. In order to pay such fees, the user's electronic funding wallet could be accessed instead of selling tokens of a user's account where the system detects that the user's digital wallet as linked to the user's electronic funding wallet as described herein.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A blockchain-based method for implementing inflow/outflow of digital assets and non-digital assets, the blockchain-based method comprising:

generating, by one or more processors, a set of digital tokens distributable on a distributed computer network;

assigning, by one or more processors, a subset of digital tokens of the set of digital tokens to a digital wallet of a user;

determining, by one or more processors, whether an electronic funding wallet of the user is linked to the digital wallet;

reducing, by the one or more processors of an electronic platform comprising one or more memories, memory storage by storing on-chain, in the one or more memories, non-redundant information used across both of the electronic funding wallet and the digital wallet; and executing an inflow/outflow algorithm by one or more processors of the electronic platform communicatively coupled to the distributed computer network, the inflow/outflow algorithm configured to implement each of a set of subroutines comprising:

(i) detecting a request for an outflow of an alternate asset, and if the digital wallet is linked to the electronic funding wallet, distributing the alternate asset from the electronic funding wallet, (ii) detecting a request for an outflow of an alternate asset, and if the digital wallet is not linked to the electronic funding wallet, converting at least a portion of the one or more of the subset of digital tokens into the alternate asset, and distributing the alternate asset as converted, (iii) detecting a transmission of an inflow of an alternate asset, and if the digital wallet is linked to the electronic funding wallet, receiving the alternate asset at the electronic funding wallet, and (iv) detecting a transmission of an inflow of an alternate asset, and if the digital wallet is not linked to the electronic funding wallet, converting the alternate asset into additional digital tokens and adding the additional digital tokens to the one or more of the subset of digital tokens, wherein the inflow/outflow algorithm implements one of the set of subroutines based upon occurrence of (1) an inflow or an outflow, and (2) whether the electronic funding wallet is linked to the digital wallet on the electronic platform.

2. The blockchain-based method of claim 1, wherein the inflow/outflow algorithm operates according to a default parameter and the default parameter determines whether either the digital wallet or the electronic funding wallet is a default source.

3. The blockchain-based method of claim 1, further comprising:

receiving, by one or more processors from the user, cryptographic keys, wherein the cryptographic keys include a public key and a private key pair, the public key publicly identifies the user while securing one or more of: (i) the electronic funding wallet, (ii) the digital wallet, or (iii) the distributed computer network, and the private key grants the user access to one or more of: (i) the electronic funding wallet, (ii) the digital wallet, or (iii) the distributed computer network, wherein the access is granted upon validation of the cryptographic keys by one or more nodes on the distributed computer network.

4. The blockchain-based method of claim 3, wherein the public key secures both the electronic funding wallet and the digital wallet when the electronic funding wallet on the electronic platform implements the inflow/outflow algorithm.

5. The blockchain-based method of claim 1, wherein one or more digital tokens in the subset of digital tokens are configured to provide regulatory compliance through identification of the user.

6. The blockchain-based method of claim 1, wherein each digital token in the subset of digital tokens can be exchanged for one or more of: (i) real-world currency, (ii) real-world items, or (iii) virtual items.

7. The blockchain-based method of claim 1, wherein each digital token in the subset of digital tokens is configured for electronic trade for one or more other digital tokens as provided to other users, and a first value of each digital token in the subset of digital tokens varies with respect to respective values of the one or more other digital tokens based upon one or more exchange rates.

8. A blockchain-based system configured to implement inflow/outflow of digital assets and non-digital assets, the blockchain-based system comprising an electronic platform, the electronic platform comprising:

one or more processors;

one or more memories; and an electronic funding wallet stored on-chain in the one or more memories of the electronic platform;

a digital wallet of a user stored on-chain in the one or more memories of the electronic platform;

computing instructions stored in the one or more memories and configured to be executed on the one or more processors, the computing instructions, when executed by the one or more processors, cause the one or more processors to:

reduce memory storage by storing on-chain, in the one or more memories, non-redundant information used across both of the on-chain electronic funding wallet and the on-chain digital wallet, generate a set of digital tokens distributable on a distributed computer network, assign a subset of digital tokens of the set of digital tokens to the digital wallet of the user, determine whether the electronic funding wallet of the user is linked to the digital wallet, and execute an inflow/outflow algorithm by the one or more processors of the electronic platform communicatively coupled to the distributed computer network, the inflow/outflow algorithm configured to implement each of a set of subroutines comprising:

(i) detecting a request for an outflow of an alternate asset, and if the digital wallet is linked to the electronic funding wallet, distributing the alternate asset from the electronic funding wallet, (ii) detecting a request for an outflow of an alternate asset, and if the digital wallet is not linked to the electronic funding wallet, converting at least a portion of the one or more of the subset of digital tokens into the alternate asset, and distributing the alternate asset as converted, (iii) detecting a transmission of an inflow of an alternate asset, and if the digital wallet is linked to the electronic funding wallet, receiving the alternate asset at the electronic funding wallet, and (iv) detecting a transmission of an inflow of an alternate asset, and if the digital wallet is not linked to the electronic funding wallet, converting the alternate asset into additional digital tokens and adding the additional digital tokens to the one or more of the subset of digital tokens, wherein the inflow/outflow algorithm implements one of the set of subroutines based upon occurrence of (1) an inflow or outflow, and (2) whether the electronic funding wallet is linked to the digital wallet on the electronic platform.

9. The blockchain-based system of claim 8, wherein the inflow/outflow algorithm operates according to a default parameter and the default parameter determines whether either the digital wallet or the electronic funding wallet is a default source.

10. The blockchain-based system of claim 8, wherein the computing instructions, when executed by one or more processors, further cause the one or more processors to:

receive cryptographic keys from the user, wherein the cryptographic keys include a public key and a private key pair, the public key publicly identifies the user while securing one or more of: (i) the electronic funding wallet, (ii) the digital wallet, or (iii) the distributed computer network, and the private key grants the user access to one or more of: (i) the electronic funding wallet, (ii) the digital wallet, or (iii) the distributed computer network, wherein the access is granted upon validation of the cryptographic keys by one or more nodes on the distributed computer network.

11. The blockchain-based system of claim 10, wherein the public key secures both the electronic funding wallet and the digital wallet when the electronic funding wallet on the electronic platform implements the inflow/outflow algorithm.

12. The blockchain-based system of claim 8, wherein one or more digital tokens in the subset of digital tokens are configured to provide regulatory compliance through identification of the user.

13. The blockchain-based system of claim 8, wherein each digital token in the subset of digital tokens can be exchanged for one or more of: (i) real-world currency, (ii) real-world items, or (iii) virtual items.

14. The blockchain-based system of claim 8, wherein each digital token in the subset of digital tokens is configured for electronic trade for one or more other digital tokens as provided to other users, and a first value of each digital token in the subset of digital tokens varies with respect to respective values of the one or more other digital tokens based upon one or more exchange rates.

15. A tangible, non-transitory computer-readable medium storing instructions for implementing inflow/outflow of digital assets and non-digital assets, that when executed by one or more processors of an electronic platform comprising one or more memories, cause the one or more processors to:

generate a set of digital tokens distributable on a distributed computer network;

assign a subset of digital tokens of the set of digital tokens to a digital wallet of a user;

determine whether an electronic funding wallet of the user is linked to the digital wallet;

reduce memory storage by storing on-chain, in the one or more memories, non-redundant information used across both of the electronic funding wallet and the digital wallet; and execute an inflow/outflow algorithm by the one or more processors of the electronic platform communicatively coupled to the distributed computer network, the inflow/outflow algorithm configured to implement each of a set of subroutines comprising:

(i) detecting a request for an outflow of an alternate asset, and if the digital wallet is linked to the electronic funding wallet, distributing the alternate asset from the electronic funding wallet, (ii) detecting a request for an outflow of an alternate asset, and if the digital wallet is not linked to the electronic funding wallet, converting at least a portion of the one or more of the subset of digital tokens into the alternate asset, and distributing the alternate asset as converted, (iii) detecting a transmission of an inflow of an alternate asset, and if the digital wallet is linked to the electronic funding wallet, receiving the alternate asset at the electronic funding wallet, and (iv) detecting a transmission of an inflow of an alternate asset, and if the digital wallet is not linked to the electronic funding wallet, converting the alternate asset into additional digital tokens and adding the additional digital tokens to the one or more of the subset of digital tokens, wherein the inflow/outflow algorithm implements one of the set of subroutines based upon occurrence of (1) an inflow or an outflow, and (2) whether the electronic funding wallet is linked to the digital wallet on the electronic platform.

16. The tangible, non-transitory computer-readable medium of claim 15, wherein the inflow/outflow algorithm operates according to a default parameter and the default parameter determines whether either the digital wallet or the electronic funding wallet is a default source.

17. The tangible, non-transitory computer-readable medium of claim 15, further comprising:

receive cryptographic keys from the user, wherein the cryptographic keys include a public key and a private key pair, the public key publicly identifies the user while securing one or more of: (i) the electronic funding wallet, (ii) the digital wallet, or (iii) the distributed computer network, and the private key grants the user access to one or more of: (i) the electronic funding wallet, (ii) the digital wallet, or (iii) the distributed computer network, wherein the access is granted upon validation of the cryptographic keys by one or more nodes on the distributed computer network.

18. The tangible, non-transitory computer-readable medium of claim 17, wherein the public key secures both the electronic funding wallet and the digital wallet when the electronic funding wallet on the electronic platform implements the inflow/outflow algorithm.

19. The tangible, non-transitory computer-readable medium of claim 15, wherein one or more digital tokens in the subset of digital tokens are configured to provide regulatory compliance through identification of the user.

20. The tangible, non-transitory computer-readable medium of claim 15, wherein each digital token in the subset of digital tokens can be exchanged for one or more of: (i) real-world currency, (ii) real-world items, or (iii) virtual items.

* * * * *